E. E. EDWARDS.
PAN LIFTER.
APPLICATION FILED MAY 1, 1909.
933,963.　　　　　　　　　　　　Patented Sept. 14, 1909.
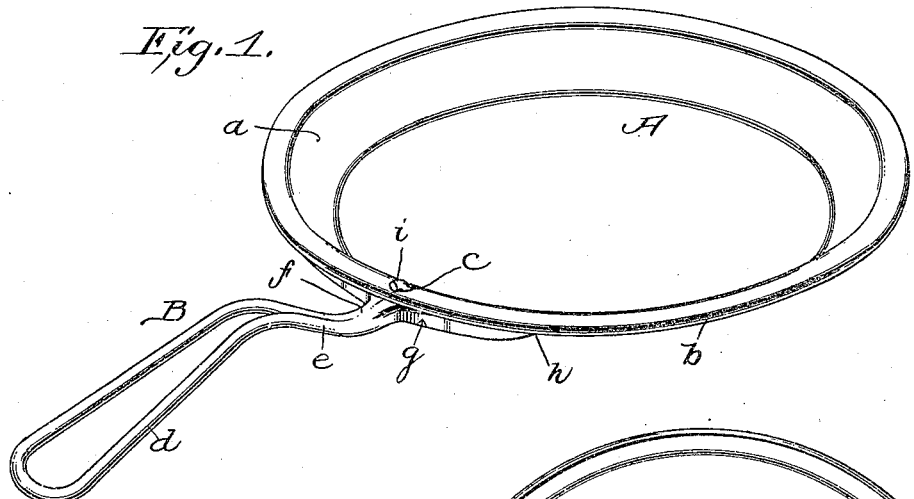
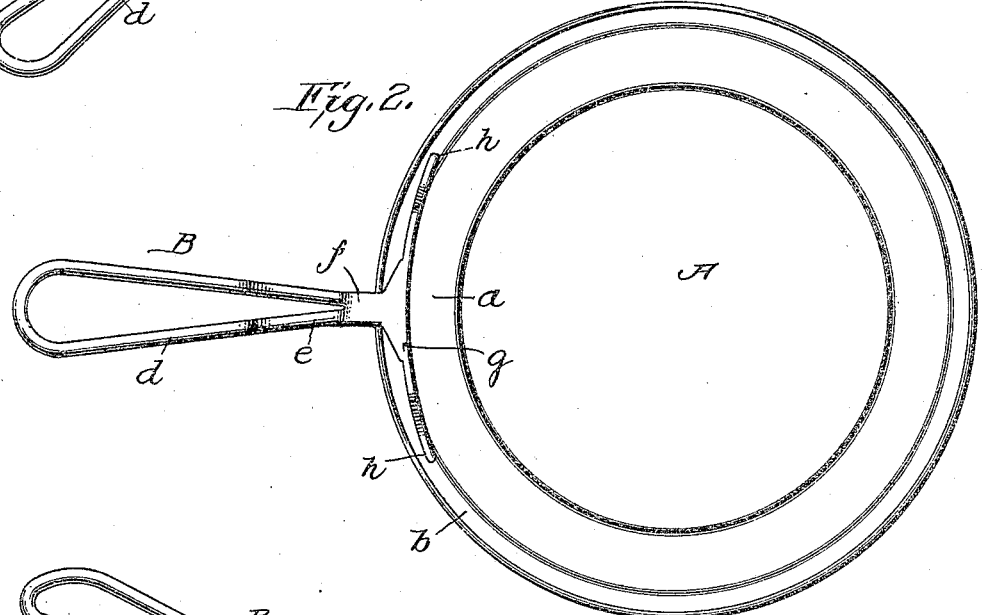
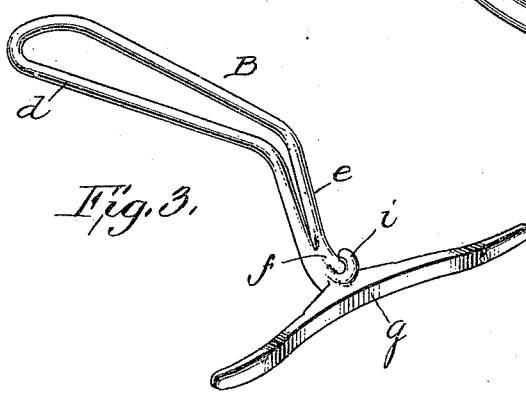
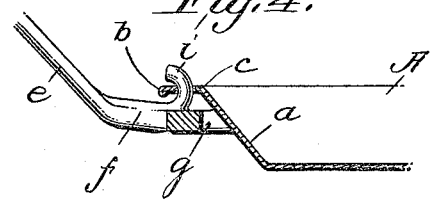
Witnesses　　　　　　　　　　　　　Inventor
　　　　　　　　　　　　　　　　　E. E. Edwards
　　　　　　　　　By
　　　　　　　　　　　　　　　　James J. Sheehy
　　　　　　　　　　　　　　　　　　Attorney

UNITED STATES PATENT OFFICE.

ELZY E. EDWARDS, OF FALFURRIAS, TEXAS.

PAN-LIFTER.

933,963.　　　Specification of Letters Patent.　Patented Sept. 14, 1909.

Application filed May 1, 1909. Serial No. 493,359.

*To all whom it may concern:*

Be it known that I, ELZY E. EDWARDS, citizen of the United States, residing at Falfurrias, in the county of Starr and State of Texas, have invented new and useful Improvements in Pan-Lifters, of which the following is a specification.

My invention relates to pan lifters—i. e., devices adapted to be detachably engaged with and used to lift and handle pans, pie-plates and the like; and it contemplates the provision of a simple and inexpensive device that is adapted, by reason of its construction, to be securely interlocked with a pan in such manner that there is no liability of the pan being accidentally released when its weight is imposed on the lifter, and yet when the pan is placed on a support, the lifter may be expeditiously and easily removed therefrom.

The invention also contemplates the provision of a pan and a lifter adapted to coöperate with the pan and to be used with facility in moving or turning the pan in an oven.

With the foregoing in mind, the invention will be fully understood from the following description and claim when the same are read in connection with the drawings, accompanying and forming part of this specification, in which:

Figure 1 is a perspective view showing my novel lifter as engaged with a pan to form the handle thereof. Fig. 2 is an inverted plan view of the same. Fig. 3 is a perspective view of the lifter as the same appears when detached from the pan. Fig. 4 is a detail vertical section showing the manner in which the lifter is engaged with the side wall and the marginal flange of the pan.

Similar letters designate corresponding parts in all of the views of the drawings, referring to which:

A is a pan having a side wall $a$ and a marginal flange $b$ in which latter is a vertically disposed aperture $c$, and B is the lifter as a whole. The lifter for the sake of cheapness is preferably cast in one piece, and is made up of a handle $d$ the forward portion of which is inclined downwardly as indicated by $e$ and is then carried forwardly as indicated by $f$, a T-head $g$ on the forward end of the handle $d$ and curved to conform to the curvature of the pan wall $a$ and also having its end portions deflected upwardly to a slight extent so as to bear at their ends against the under side of the pan flange $b$, as indicated by $h$ in Figs. 1 and 2, and an upwardly and rearwardly directed hook $i$ joined to the portion $f$ of the handle at about the point where the said handle portion merges into the T-head $g$.

In the practical use of my novel lifter the same is applied by placing the hook $i$ in the aperture $c$ from below the flange $b$ of the pan, whereupon, as will be readily understood, the end portions $h$ of the T-head $g$ will bear against the underside of the flange $b$ with the result that when the pan is lifted through the medium of the device B, the weight of the pan will tend to securely hold it in engagement with the hook $i$ and also with the ends $h$ of T-head $g$, and consequently there is no liability of the pan becoming accidentally disconnected from the lifter. When, however, it is desired to remove the lifter from the pan, the same can be readily accomplished by placing the pan on an oven bottom or other support and then manipulating the lifter so as to move the hook $i$ downwardly and out of the aperture $c$.

It is frequently desirable to move hot pans about on an oven bottom, and my novel lifter is well adapted to meet this condition inasmuch as either end $h$ of the T-head $g$ may be readily inserted in the opening $c$ of the pan, and then the pan may be moved about on the oven bottom through the medium of the lifter used as a handle, after which the lifter may be expeditiously and easily removed from the pan.

It will be gathered from the foregoing that my novel lifter is very simple and inexpensive, and that the aperture $c$ because of its location in the marginal flange $b$ does not lessen in any measure the holding capacity of the pan.

Having described my invention what I claim and desire to secure by Letters-Patent, is:

As a new article of manufacture, a lifter adapted to be used in conjunction with a pan having a marginal, horizontal flange in which is a vertically disposed aperture; the said lifter being formed in one piece and comprising a handle, a T-head, extending horizontally in opposite directions from the forward end of the handle, curved to conform to the curvature of the pan wall and having upwardly deflected end portions adapted to bear against the under side of and support said flange, and an upwardly and rearwardly directed hook on the forward portion of the handle and disposed immediately above the T-head.

In testimony whereof I have hereunto set my hand in presence of two subscribing witnesses.

ELZY E. EDWARDS.

Witnesses:
  JAMES T. TRACY,
  EMMET G. EDWARDS.